United States Patent [19]
Babiec, Jr. et al.

[11] 3,968,170
[45] July 6, 1976

[54] HALOGENATED ACETALS

[75] Inventors: John S. Babiec, Jr.; Richard J. Turley, both of Orange, Conn.

[73] Assignee: Olin Corporation, New Haven, Conn.

[22] Filed: Sept. 22, 1975

[21] Appl. No.: 615,701

Related U.S. Application Data

[60] Continuation-in-part of Ser. No. 489,953, July 15, 1974, abandoned, which is a division of Ser. No. 400,385, Sept. 24, 1973, Pat. No. 3,843,569.

[52] U.S. Cl. .................... 260/615 A; 260/2.5 AJ; 260/65.7 R; 260/77.5 AP; 260/DIG. 24; 260/611 A
[51] Int. Cl.² ......................................... C07C 43/30
[58] Field of Search .............................. 260/615 A

[56] References Cited
UNITED STATES PATENTS

| | | | |
|---|---|---|---|
| 2,473,014 | 6/1949 | Croxall | 260/615 A |
| 2,556,905 | 1/1951 | Copenhaver | 260/615 A |
| 2,802,879 | 8/1957 | Guest et al. | 260/615 A |
| 2,815,384 | 12/1957 | Guest et al. | 260/615 A X |
| 3,009,888 | 11/1961 | Mueller-Tomm et al. | 260/615 A |
| 3,137,661 | 6/1964 | Rose et al. | 260/615 A X |
| 3,660,502 | 5/1972 | Case | 260/615 A |

*Primary Examiner*—Howard T. Mars
*Attorney, Agent, or Firm*—F. A. Iskander; T. P. O'Day

[57] ABSTRACT

A new group of halogenated acetals is disclosed. These acetals, which are derived from the reaction of 2,4,4,4-tetrachlorobutanol with an aldehyde, are useful as additives for reducing the burning rate of polyurethane foam.

5 Claims, No Drawings

HALOGENATED ACETALS

This application is a continuation-in-part of co-pending application Ser. No. 489,953 filed July 15, 1974 now abandoned which is in turn a division of application Ser. No. 400,385, filed Sept. 24, 1973, now U.S. Pat. No. 3,843,569.

This invention relates to a new group of halogenated acetals and to the use of these acetals as additives for reducing the combustibility or burning rate of polyurethane foam.

It is known to prepare acetals by reacting an alcohol with an aldehyde as disclosed in U.S. Pat. No. 2,668,862. Halogenated acetals based on ethyl alcohol are also known as disclosed for example in U.S. Pat. No. 2,579,021. Other halogenated acetals have been disclosed in the art. See for instance U.S. Pat. No. 3,009,888 and Shipp et al., "Acetal Preparation in Sulfuric Acid," J. Org. Chem., March 1966, pp. 853–856.

Now, in accordance with the invention, a new group of halogenated acetals has been found which are products of condensing 2,4,4,4-tetrahalobutanol with a mono- or dialdehyde. These acetals are useful as additives for reducing the combustibility of polyurethane foam.

Generally speaking, a wide range of aldehydes may be employed in preparing the acetals of the invention. This includes, for example, the heterocyclic aldehydes, such as furfural, and various substituted aliphatic and aromatic aldehydes such as methoxyacetaldehyde, salicylaldehyde, and piperonal. Also, the halogen in the tetrahalobutanol reactant can be chlorine, bromine or a mixture thereof. However, in accordance with the preferred embodiments of the invention, the acetals are derived from 2,4,4,4-tetrachlorobutanol and a halogen-free or halogen-substituted aliphatic, aromatic, or aliphatic-aromatic aldehyde. These acetals may be represented by formula I as follows:

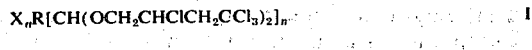

wherein
X is chlorine, bromine, or a mixture thereof,
$a$ is an integer from 0 to 4
R is hydrogen, alkyl, alkene, aryl, alkaryl, or aralkyl, and
$n$ is 1 or 2.

The aldehyde which is employed in preparing the acetals of formula I can be any compound represented by formula II as follows:

$$X_aR(CHO)_n \quad \quad II$$

wherein X, $a$, R, and $n$ have the significance indicated above. Where the R radical in the aldehyde represents an alkyl group, this usually contains 1–12, and preferably 1–4, carbon atoms, such as methyl, ethyl, propyl, butyl, hexyl, and dodecyl; where the R radical is alkene, this again usually contains 2–12, and preferably 2–, carbon atoms such as ethylene, propene, butene, and dodecene; where R is aryl, this usually contains 6–12, and preferably 6, carbon atoms such as phenyl, biphenyl, and naphthyl; where R is alkaryl, this usually contains 7–12, and preferably 7, carbon atoms such as tolyl, xylyl, ethylphenyl, isopropylphenyl, and tertiary butylphenyl; and where R is aralkyl, this usually contains 7–12, and preferably 7, carbon atoms such as benzyl, phenylethyl, and phenylhexyl.

The following list is illustrative of the aldehydes which may be used in preparing the acetals of the invention:

| | |
|---|---|
| formaldehyde | 4,4,4-trichlorobutyraldehyde |
| acetaldehyde | 2-bromopropionaldehyde |
| propionaldehyde | 3-bromopropionaldehyde |
| butyraldehyde | 4,4,4-tribromobutyraldehyde |
| acrylaldehyde | bromal |
| crotonaldehyde | acrolein |
| chloroacetaldehyde | benzaldehyde |
| bromoacetaldehyde | tolualdehyde |
| dichloroacetaldehyde | m-chlorobenzaldehyde |
| dibromoacetaldehyde | m-bromobenzaldehyde |
| chloral | 2,4-dichlorobenzaldehyde |
| 2-chloropropionaldehyde | glyoxal |
| 3-chloropropionaldehyde | succinaldehyde |
| 2,3-dichloroprionaldehyde | terephthaldehyde |

In preparing monoacetals of formula I, one mole of a monoaldehyde of formula II wherein $n = 1$ is reacted with two moles of 2,4,4,4-tetrachlorobutanol; whereas, to prepare diacetals of formula I, one mole of a dialdehyde of formula II wherein $n = 2$ is reacted with four moles of the tetrachlorobutanol. These reactions are illustrated in equation III as follows:

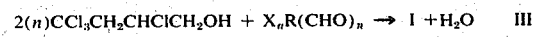

wherein X, $a$, R and $n$ have the above significance.

The reaction is generally carried out in the presence of an acidic catalyst, e.g., sulfuric acid, and preferably an inert solvent such as benzene. Water is removed from the reaction medium as it is formed by any suitable means such as by co-distillation with the solvent using a Dean-Stark trap. Alternatively, magnesium sulfate may be added to the reaction mixture to absorb the water. Depending on the reactivity of the particular aldehyde used, the reaction may be carried out at room temperature or at moderately elevated temperatures, e.g., the reflux temperature for the solvent if such is used. If desired, the reaction may be effected at subatmospheric pressure which would enable distilling off the water at reduced temperatures. Completion of the reaction is signaled when no more water is produced. At this point, the solids if any, i.e., MgSO$_4$, are filtered out, the acid catalyst is removed by washing with a dilute, aqueous base solution, and any volatiles, i.e., solvent if such is used, are removed by distillation at reduced pressure.

In accordance with the more preferred embodiments of the invention, a lower, saturated aliphatic monoaldehyde is employed in preparing acetals having formula IV as follows:

$$X_aRCH(OCH_2CHClCH_2CCl_3)_2 \quad \quad IV$$

wherein
R is hydrogen or alkyl of 1–3 carbon atoms,
$a$ is an integer from 1 to 3 and,
X is as signified above.

Illustrative of the preferred acetals represented by formula IV are:

bis(2,4,4,4-tetrachlorobutyl) 4,4,4-trichlorobutyral
bis(2,4,4,4-tetrachlorobutyl) 3-chloropropional
bis(2,4,4,4-tetrachlorobutyl) chloroacetal
bis(2,4,4,4-tetrachlorobutyl) 2-chloropropional
bis(2,4,4,4-tetrachlorobutyl) 2,3-dichloropropional bis(2,4,4,4-tetrachlorobutyl) dichloroacetal
bis(2,4,4,4-tetrachlorobutyl) 4,4,4-tribromobutyral
bis(2,4,4,4-tetrachlorobutyl) 3-bromopropional
bis(2,4,4,4-tetrachlorobutyl) dibromoacetal The most preferred acetals of the invention are those of formula IV above in which R is alkyl of 2-3 carbons and X is chlorine, such as bis(2,4,4,4-tetrachlorobutyl) 4,4,4-trichlorobutyral and bis(2,4,4,4-tetrachlorobutyl) 3-chloropropional.

In accordance with the invention, the acetals represented by formula I are useful, in the preparation of polyurethane foam, as additives for reducing the combustibility of the foam.

In the preparation of the polyurethane foam, either the so-called "one-shot method" or the "semi-prepolymer technique" may be employed, the one-shot method being preferred. Any combination of polyols, including polyester polyols and polyether polyols, organic polyisocyanates, foaming agent, catalyst, and other reactants capable of forming a cellular urethane material may be used in preparing the foam. Typical formulations are described in U.S. Pat. No. 3,072,582, issued Jan. 8, 1963, and Canadian Pat. No. 705,938 which issued Mar. 16, 1965.

While, as indicated above, both polyether and polyester polyols can be employed in the practice of this invention, preferred embodiments utilize polyether polyols in the preparation of the polyurethane foam forming reaction mixture. Any suitable polyether polyol may be used for this purpose. These polyether polyols usually have a hydroxyl number for example from about 25 to about 800.

The polyether polyols include for example oxyalkylated polyhydric alcohols having a molecular weight range of about 200–10,000 and preferably about 250 8,000. These oxyalkylated polyhydric alcohols are generally prepared by methods well known in the art such as by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, using either ramdom or step-wise addition.

Polyhydric alcohols suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine may be used. Amides, such as acetamide, succinamide and benzensulfonamide constitute a further class of such reactive hydrogen compounds. A still further class of reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine may also be employed. Mixtures of oxyalkylated polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bi-toluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH group times 100 is referred to as the "index."

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkenes, ethers, and mixtures thereof. Typical halogenated hydrocarbons include, but are not limited to, monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof and the like. The amount of foaming agent employed may be varied within a wide range. Generally, however, the halogenated hydrocarbons are employed in an amount from about 1 to about 50, and preferably about 5-35, parts per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts, and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octaote, and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the invention to employ minor amounts of a conventional surfactant in order to further improve the cell structure of the polyurethane foam. Typical of such surfactants are the silicones and the siloxaneoxyalkylene block copolymers. U.S. Pat. No. 2,834,748 and T. H. Ferrigno, *Rigid Plastic Foams* (New York-Reinhold Publishing Corp., 1963) pages 38–42, disclose various surfactants which are useful for this purpose. Generally up to 2 parts by weight of the surfactant are employed per 100 parts of the polyol.

In the preparation of polyurethane foam according to the invention, the acetals represented by formula I above are incorporated as additives in the polyurethane forming reaction mixture before foaming. Conveniently, they are first mixed in with the polyol reactant, and the other ingredients used in making the foam then added to this mixture. Any suitable proportion of these additives may be used which is effective in reducing the combustibility of the foam without otherwise interferring with the foaming reaction or materially altering the properties of the resulting foam. For example, the acetals may be used in proportion of about 5–45, preferably about 10–40, and still more preferably about 15–35, parts per every 100 parts by weight of total polyol which is employed in preparing the polyurethane foam.

In accordance with one preferred embodiment of the invention, increased effectiveness of the halogenated acetal additive is achieved by incorporating in the foam forming formulation, prior to foaming, antimony oxide or antimony oxyhalide as a co-additive. By combining both additives in the foam, a synergistic combustion retarding effect is attained.

The antimony oxide co-additive can be for example antimony trioxide ($Sb_2O_3$) or antimony tetraoxide ($Sb_2O_4$); and the antimony oxyhalide can be for example antimony oxychloride (e.g., $SbOCl$ or $Sb_4O_5Cl_2$) or antimony oxybromide. The most preferred antimony co-additive is antimony trioxide.

The antimony co-additive can be employed in any suitable proportion which enhances the combustion retarding effect of the acetal without otherwise detrimentally affecting the foaming reaction or the properties of the resulting foam. For example, it may be employed in a proportion ranging from about 1 to about 25, and preferably about 3–15, parts per every 100 parts by weight of total polyol used in making this foam.

The acetals of the invention have all the basic attributes which are sought after in additives that are used to reduce the combustibility or burning rate of polyurethane foam. Thus they are simple to prepare and relatively inexpensive to use as additives. They are also inert materials which exert no adverse effect on the foam nor alter its physical properties. Finally, the inclusion of these acetals in the polyurethane foam-forming reaction mixture yields a foam which, although not self-extinguishing under actual fire conditions, exhibits a reduction in combustibility.

As such the acetals of the invention are of utility in making polyurethane foam for use in those applications wherein such a cellular material is desired or required which exhibits a certain measure of reduction in combustibility or burning rate. These applications include, for example, the manufacture of furniture cushions, carpet underlayments, and mattresses.

The following examples are provide to illustrate the invention. In these examples, all parts and percentages are by weight unless otherwise specified.

EXAMPLE 1

Bis(2,4,4,4-tetrachlorobutyl) 3-chloropropional

In a reaction vessel equipped with a thermometer and a mechanical agitator, 106 gms. of 2,4,4,4-tetrachlorobutanol were dissolved in 75 mls. of benzene. The solution was then saturated with anhydrous hydrochloric acid at 0°C and in the presence of 30 gms. of anhydrous magnesium sulfate. An ice bath was used to control the temperature. Acrolein was thereafter added to the mixture drop-wise and at such a rate as to maintain the temperature inside the reaction vessel below 2°C. After a total of 14 gms. of acrolein were added, the mixture was agitated for an additional hour while being maintained within a temperature range of 0°–2°C. It was then allowed to stand at room temperature for three days. The benzene was then removed by distillation under partial vacuum. Any residual water present was removed by adding a fresh quantity of benzene and stripping this off with the residual water at reduced pressure. The remaining reaction product mixture was dissolved in benzene followed by filtration to remove undissolved solids. After stripping off the benzene, the bis(2,4,4,4-tetrachlorobutyl) 3-chloropropional product was recovered from the reaction mixture by extraction with a solvent mixture of 360 mls. methanol and 240 mls. water. The lower acetal phase was separated from the methanol-water system and stripped of volatiles by heating at 45°–50°C and 0.2 m.ms. of mercury pressure. The acetal product thus obtained was a light brown liquid. The structure of bis(2,4,4,4-tetrachlorobutyl) 3-chloropropional was confirmed by nuclear magnetic resonance as follows, based on the emperical formula $C_{11}H_{15}Cl_9O_2$, Calculated: 26.51% carbon, 3.03% hydrogen, and 64.03% chlorine. Found: 27.16% carbon, 2.91% hydrogen, and 63.68% chlorine.

EXAMPLE 2

Bis(2,4,4,4-tetrachlorobutyl) n-butyral

A mixture of 106 gms. of 2,4,4,4-tetrachlorobutanol, 18 gms. of n-butyraldehyde, 2 gms. of p-toluenesulfonic acid, 30 gms. of anhydrous magnesium sulfate, and 150 mls. of benzene was stirred at room temperature for 64 hours. Then, after the resulting mixture was freed of solids by filtration, the benzene was removed by distillation at sub-atmospheric pressure. A chloroform solution of the residue was successively washed with water, a saturated aqueous sodium bicarbonate solution, and then again with water. Solvent and most of the unreacted alcohol were removed by vacuum distillation. A carbon tetrachloride solution of the residue was passed through a 50 gms. column of silica gel to remove remaining traces of alcohol. A light brown liquid acetal product was then recovered after stripping off the carbon tetrachloride solvent. The structure of bis(2,4,4,4-tetrachlorobutyl) n-butyral was confirmed by nuclear magnetic resonance, gel permeation chromatography, and infrared analysis.

EXAMPLE 3

Bis(2,4,4,4-tetrachlorobutyl) 2,4-dichlorobenzal

A solution of 424 gms. of 2,4,4,4-tetrachlorobutanol in 300 mls. of benzene was mixed with 175 mls. of 2,4-dichlorobenzaldehyde and 5 mls. of concentrated sulfuric acid. Using a Dean-Stark water trap to remove the water as it is formed, the mixture was refluxed until no more water appeared. The acetal product was separated from the reaction mixture by extraction with a methanol-water solvent system. Thus separated, the acetal product was dissolved in carbon tetrachloride and then successively washed with an aqueous 20% solution of sodium bisulfite, water, 10% aqueous potassium carbonate, and finally again with water. The washed solution was dried over magnesium sulfate, and after being substantially decolorized with charcoal, it was freed of volatiles by heating at reduced pressure. The acetal product thus recovered was a light brown syrup, and the structure of bis(2,4,4,4-tetrachlorobutyl) 2,4-dichlorobenzal was confirmed by infrared analysis.

EXAMPLE 4

Polyurethane Foam

A flexible polyurethane foam was prepared from the following ingredients in the indicated proportions:

| Ingredients | Proportions |
| --- | --- |
| Oxypropylated glycerin, mol. wt. 3,000 | 100 gms. |
| Water | 4 mls. |
| Triethylene diamine catalyst* | 0.4 mls. |
| Stannous octoate catalyst | 0.3 mls. |
| Surfactant** | 1.5 mls. |
| Toluene diisocyanate (80/20 mixture of 2,4-/2,6-isomers) | 50 gms. |

*This material, purchased under the trademark Dabco 33LV, contains about 33% triethylene diamine, the balance being substantially dipropylene glycol.
**This surfactant, purchased under the trademark DC-190, is a block copolymer of polydimethylsiloxane and a polyester resin.

To the above mixture, 25 grams of bis(2,4,4,4-tetrachlorobutyl) 3-chloropropional were added. Procedurally, this was blended in with the oxypropylated glycerin before adding the other ingredients of the foam forming reaction mixture. The total mixture was then poured into an open-top, cardboard box and allowed to expand into a flexible foam block which was oven cured at 110°C for 20 minutes.

The combustibility of the foam was investigated using a standardized method described in ASTM D-1692-68 for testing the flammability of plastic sheeting and cellular plastics. This test method is not a criterion for determining fire hazard nor does it necessarily provide a correlation with the flammability of the material being tested under actual use conditions. However, this method is valuable in comparing the flammability of various cellular materials.

Following the procedure described in the ASTM method, a specimen, measuring 6 inches long, 2.0 inches wide and 0.5 inch thick, was cut from the foam block prepared above. The specimen was ignited on one end. As a result, it burned but was not completely consumed by the flame. Rather, the combustion ceased after a while and before the sample was completely consumed. The extent of the burn was measured and found to be limited to an average of 4.5 inches of the total length of the sample. Also the average burn rate was 3.5 inches per minute.

For purposes of comparison, another foam was prepared exactly as described above except for the exclusion of the bis(2,4,4,4-tetrachlorobutyl) 3-chloropropional from the foam forming reaction mixture. When a specimen of this foam was subjected to the same combustibility test described above, it exhibited no resistance to burning. Thus it burned through and was completely consumed by the flame. The average burn rate was 6.3 inches per minute.

The above example and comparison demonstrate the effectiveness of the acetals of the invention in reducing the combustibility and burning rate of polyurethane foam.

EXAMPLE 5

Polyurethane Foam

The identical procedure of Example 4 was followed except that there were also included in the foam forming reaction mixture 10 grams of anitmony trioxide. When the combustibility of the resulting foam was checked, the test specimen exhibited further reduction in combustibility over that of Example 4. Thus the average extent of burning here was 2.2 inches and the average burn rate was 2.8 inches per minute. This example demonstrates the synergistic reduction in combustibility which obtains by using a co-additive mixture of an acetal of the invention and antimony trioxide.

What is claimed is:

1. Halogenated acetals represented by the formula

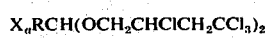

$$X_aRCH(OCH_2CHClCH_2CCl_3)_2$$

wherein
R is hydrogen or alkyl of 1–3 carbon atoms,
$a$ is an integer from 1 to 3, and
X is chlorine, bromine or a mixture thereof.

2. An acetal as claimed in claim 1 selected from the group consisting of
bis(2,4,4,4-tetrachlorobutyl) 4,4,4-trichlorobutyral,
bis(2,4,4,4-tetrachlorobutyl) 3-chloropropional,
bis(2,4,4,4-tetrachlorobutyl) chloroacetal,
bis(2,4,4,4-tetrachlorobutyl) 2-chloropropional,
bis(2,4,4,4-tetrachlorobutyl) 2,3-dichloropropional,
bis(2,4,4,4-tetrachlorobutyl) dichloroacetal,
bis(2,4,4,4-tetrachlorobutyl) 4,4,4-tribromobutyral,
bis(2,4,4,4-tetrachlorobutyl) 3-bromopropional, and
bis(2,4,4,4-tetrachlorobutyl) dibromoacetal.

3. The acetals of claim 1 wherein X is chlorine and R is alkyl of 1–3 carbon atoms.

4. An acetal as claimed in claim 3 which is identified as bis(2,4,4,4-tetrachloroburyl) 4,4,4-trichlorobutyral.

5. An acetal as claimed in claim 4 which is identified as bis(2,4,4,4-tetrachlorobutyl) 3-chloropropional.

* * * * *